United States Patent [19]
Pecis

[11] 3,948,451
[45] Apr. 6, 1976

[54] MACHINE FOR THE WORKING OF CEREALS FOR THE NOURISHMENT OF CATTLE

[76] Inventor: Egidio Pecis, Via Marconi, 7, Zanica (Bergamo), Italy

[22] Filed: Sept. 11, 1974

[21] Appl. No.: 505,081

[30] Foreign Application Priority Data
Sept. 14, 1973 Italy.................................. 2938/73

[52] U.S. Cl. ............................ 241/154; 241/101 B
[51] Int. Cl.² .......................................... B02C 9/00
[58] Field of Search ......... 241/101 B, 101.7, 152 A, 241/154

[56] References Cited
UNITED STATES PATENTS
2,081,552  5/1937  Myers............................ 241/101 B
3,396,767  8/1968  Blanshine et al. ........... 241/101.7 X

*Primary Examiner*—Roy Lake
*Assistant Examiner*—E. F. Desmond
*Attorney, Agent, or Firm*—Steinberg & Blake

[57] ABSTRACT

A machine for the working of cereals for the nourishment of cattle, comprising a removable cutting group for cutting cobs, stems and the like, a grinding group for grains, an outlet conveying means and a possible fan for directing the worked material to an ensiling pipe, as well as a power means for actuating the whole machine. The grinding group is so constructed as to break the grains but not reduce them into powder.

4 Claims, 11 Drawing Figures

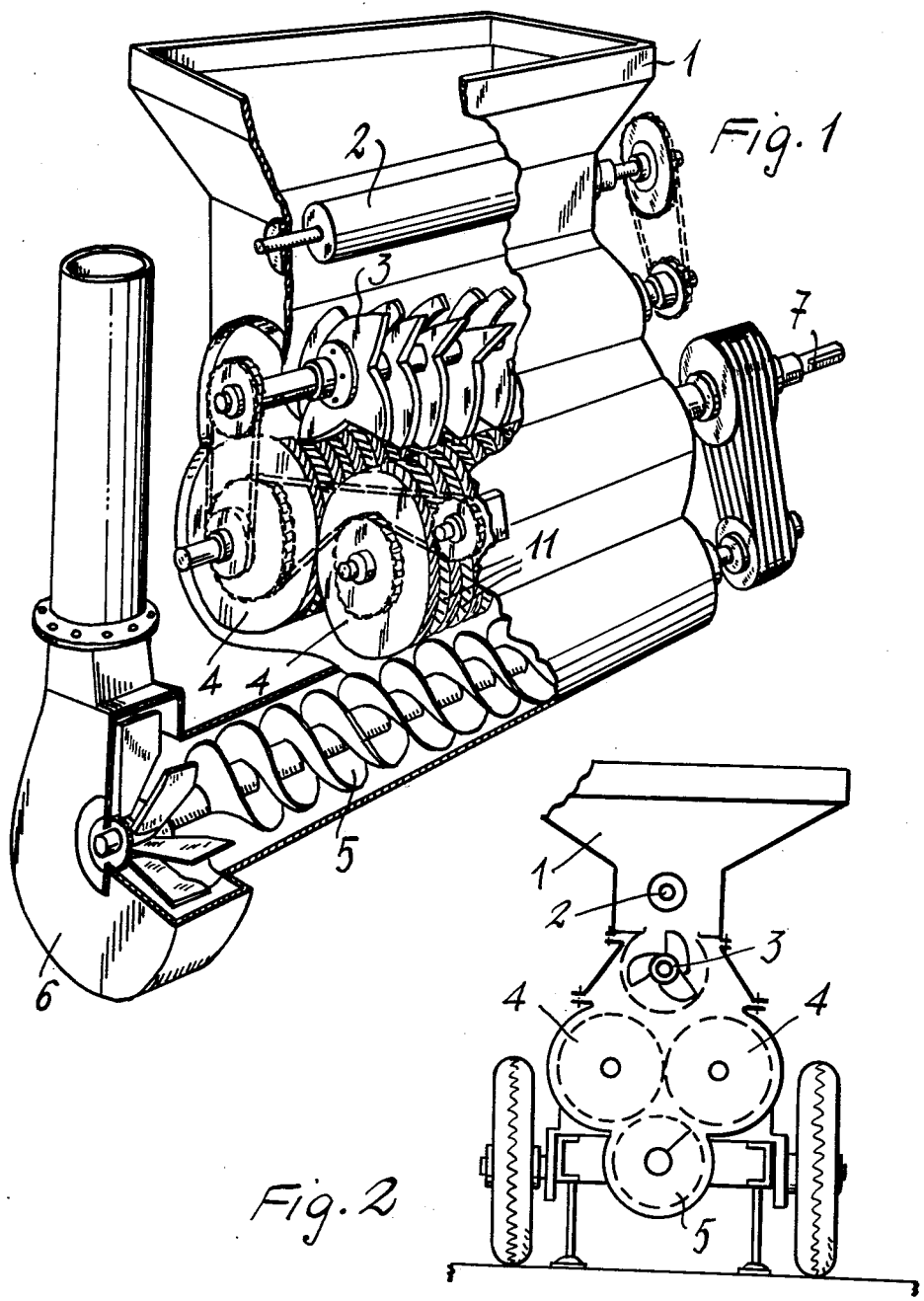

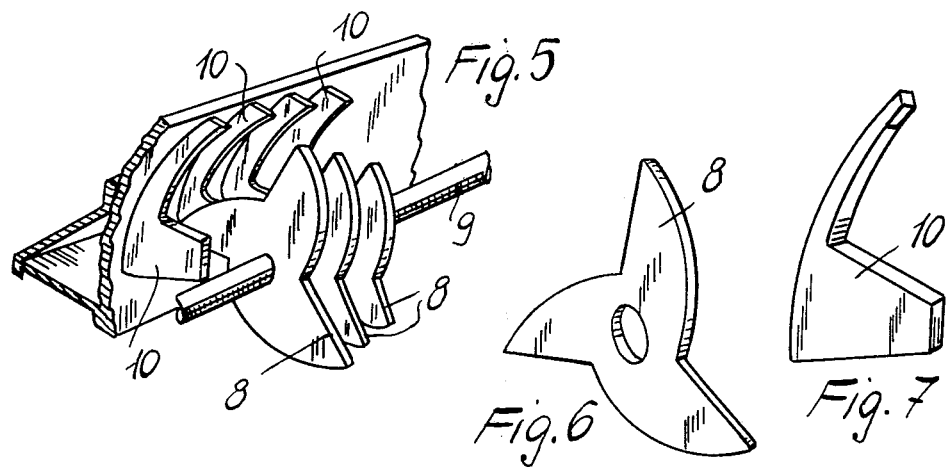
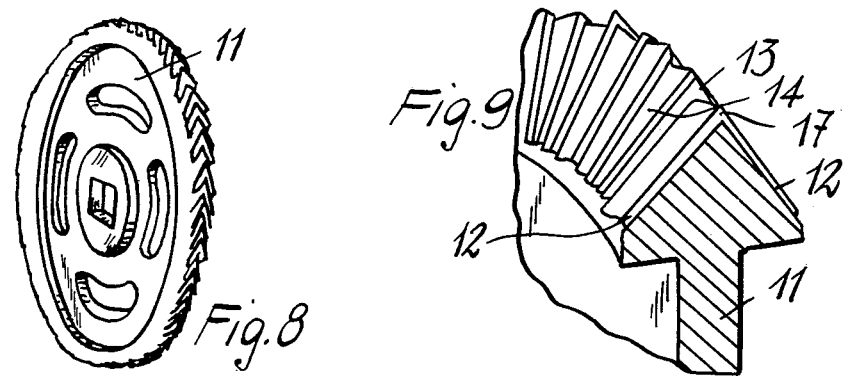
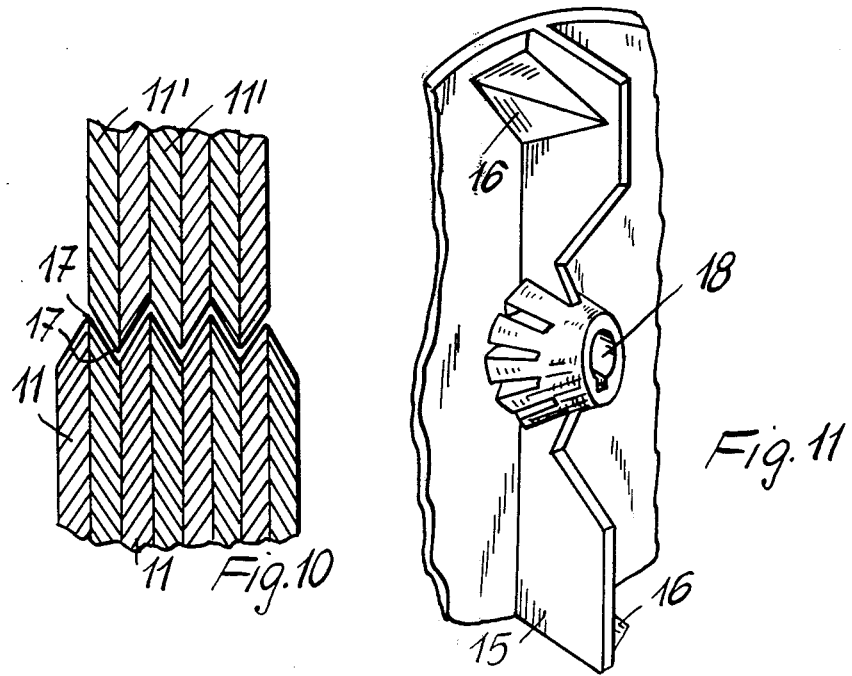

MACHINE FOR THE WORKING OF CEREALS FOR THE NOURISHMENT OF CATTLE

The present invention relates to a machine for the working of cereals to be used as nourishment for cattle, especially for preparing a mash for cattle from cobs or grains of cereals, both in a green and in a dry state, as well as for the reworking of ensiled integral cereals.

Several types of machines are known which are used for working cereals as nourishment for cattle and the like. One of these types of machine comprises so-called hammer grinders or mills which reduce completely to powder the dry cereal put into the machine. It has however been found that, due to the strong overheating on the product during the working for transforming it into a powder phase, a great amount of its nourishing properties is lost, thus giving a fodder that does not fully meet the requirements. Other types of machines can break or cut entire cereal plants which are reduced to small pieces that are easily digested, thus giving a fairly good nourishment. These last-mentioned machines have however the drawback that they can in no way grind the cereal grains, so that these are not digested by cattle and are eliminated intact together with the excrements. It can therefore be said that with these machines the most nourishing part, i.e. the grain, is lost.

It has now been found that an optimal cattle nourishment can be obtained if, using cereals in cobs, grains and also in the presence of possible stems, preferably in a green state or at least with a certain moisture amount, the corn itself is worked so that the grain is broken but not reduced to powder, thus obtaining a so-called mash with a high nourishing degree. The working of cereals in this condition is not possible either with the machines of the above-mentioned first type, which can only reduce the product into powder, or with the machines of the above second type, which can only cut into pieces the cereal plants but leave the grains intact.

It is an object of the present invention to provide a new and original machine which allows to eliminate the above mentioned drawbacks, together with a simple construction and a relatively low cost of the machine, which is of high reliability and allows especially to obtain a mash for cattle from cereals in a green state, although it can also work on cereals in a dry state.

This is obtained, according to the present invention, with a machine for the above-mentioned purposes, comprising an opening for the material to be worked, preferably consisting of a hopper, and an outlet for the worked material as well as power means, such as a motor, embodied in the machine or associated thereto, wherein between said opening and said outlet there are provided a removable cutting group, a grinding group comprising at least a pair of grinding cylinders, each of them formed by a plurality of discs notched or toothed on their circumferential periphery and affixed on a respective rotating shaft side by side so as to form a cylinder capable of co-operating with a similar cylinder of the same pair, and in addition thereto a conveying means, preferably a screw feeder, for conveying to the outlet the worked material, wherein associated with said outlet there can be provided a fan, an impeller or the like, powdered by the shaft of said screw and apt to direct said worked material upwards along an ensiling pipe, at the bottom of said hopper there being provided a shaft with an eccentric or cam thereon actuated by the same power means of the machine through a suitable transmission means.

These and further objects, features, details and advantages of the machine according to the present invention will be better understood by those skilled in the art from the following detailed description of a preferred embodiment, given as a non-limiting example, in connection with the annexed drawings in which:

FIGS. 1, 2 and 3 show respectively a perspective view, an end section view and a side view, with housing partially removed, of the machine according to the invention;

FIG. 5 shows a detail of the cutting group;

FIG. 6 and FIG. 7 show respectively a blade belonging to the rotary group and a stationary counterblade associated therewith;

FIG. 8 shows one of the pluralities of discs which form each grinding cylinder;

FIG. 9 shows a detail of said discs;

FIG. 10 shows in a pair of cylinders the engagement of the various discs which form the cylinders; and FIG. 11 shows a detail of the fan associated with the machine according to the invention.

Figure 3:
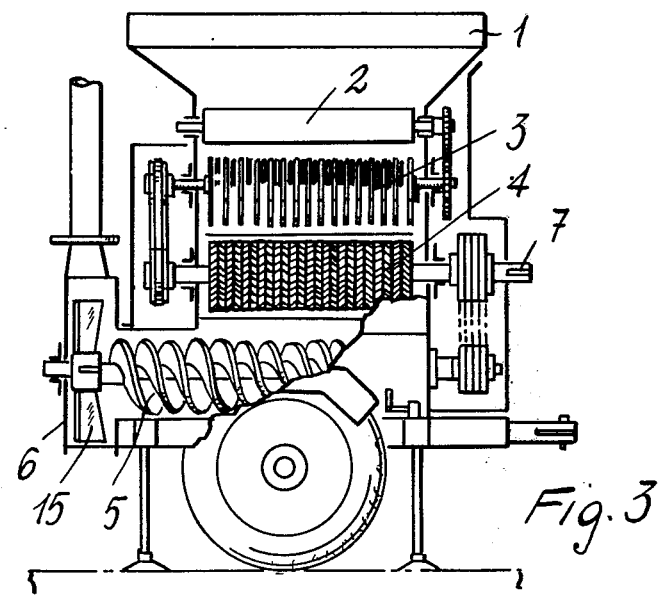

Referring now to the drawings and in particular to FIGS. 1, 2, 3 and 4, with reference numeral 1 there is indicated an inlet hopper for the cereal to be worked, at the botton of which there is provided a clog-preventing eccentric or cam 2 mounted on a rotating shaft that is actuated by the same means which actuate the whole machine. This cam by its rotation prevents, in particular during the working of cobs, a clog of these cobs on the bottom of the hopper, which would stop the feeding to the other elements of the machine. Reference numeral 3 indicates a cutting group which can be removed, for example during the working of grains only. This cutting group will be better described below. Underneath said cutting group there is provided at least a pair of grinding cylinders 4, 4 each of them being formed by a plurality of discs 11 or 11' respectively, which are fixed on an actuating shaft so as to give a "pack" of discs that forms a cylinder. Below the grinding discs there is a channel with a screw feeder 5 which is intended to feed the worked material to the outlet. At the outlet there is a fan or impeller 6 which is intended to receive the material fed from screw 5 and to direct it upwards along an ensiling pipe that can be seen in FIGS. 1 and 3. There is also provided a power take-off 7 that can be actuated by a motor associated with the machine, and which through a belt or chain transmission or the like actuates the whole machine, that is the grinding group 4, the cutting group 3, the cam 2 as well as the screw feeder 5 and, if required, through the screw shaft the blades of fan 6.

Figure 4:
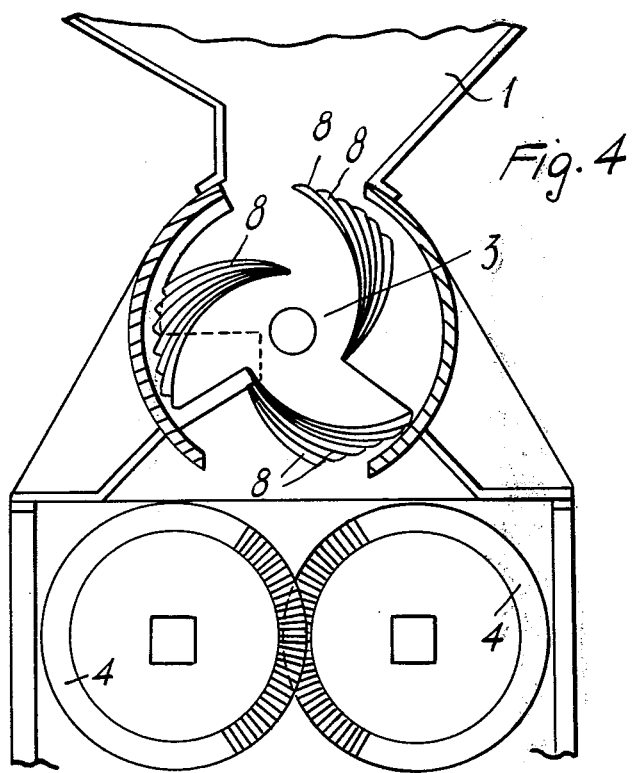
FIG. 4 shows a schematic general view of the cutting group and of the grinding group.

Referring now to FIGS. 4, 5, 6 and 7, the cutting group according to the invention will be better described. Said cutting group comprises a plurality of rotating blades 8, each shaped as a three-pointed star with each point having a straight side and a convex side, with said plurality of blades 8 fixedly mounted on a rotary shaft 9 actuated by the power take-off through the above-mentioned transmission. The blades 8 are arranged axially spaced on the shaft 9 so that they can pass through the spaces between co-operating stationary blades 10 provided on the inside wall of the housing of the machine, as can be seen in FIG. 5. Blades 8 are also circumferentially staggered or offset so as to assume a fan-wise arrangement, as can be seen in FIG. 4, because this arrangement increases the efficiency of said cutting group, making the cutting action continuous and constant.

As pointed out above, each grinding cylinder 4 consists of a plurality of discs 11 or 11' respectively, which are fixedly mounted on a respective supporting rotary shaft and are arranged side by side in a "pack" so as to form a cylinder 4. These discs are better illustrated in connection with FIGS. 8, 9 and 10. As can be seen from these figures, each disc 11 presents circumferentially on both sides a side bevel 12, these bevels converging at the apex along the entire circumference of each disc. Each of these side bevels 12 on each side presents successively a step-shaped part 13 and a subsequent part 14 extending partially flush and then sloping down to the inside up to the foot of the subsequent step. This results in the advantage that the material to be worked is surely engaged and then can easily flow withouth being reduced to powder. The apexes 17 formed by the bevels 12 of the discs of each cylinder are offset or staggered as regards the apexes of the other cylinder, so that the pair of grinding cylinders co-operates, as illustrated in FIG. 10.

FIG. 11 shows schematically a detail of a rotating element 15 of fan 6. As it can be seen from the figure, the fan has at its center a hollow hub 18 for the engagement with the end of the shaft of screw 5, thus providing for the drive of the fan elements 15. In particular the construction at the center and at the periphery of the hub is such as to allow the deflection of the material from the center to the periphery, due to centrifugal force. On each blade of the fan, on alternate sides, there is provided a projecting part 16 acting as a deflecting and guiding element which collects the material coming from the center under the action of centrifugal force and throws it upwards along the ensiling pipe arranged at the top of group 6, as can be seen in FIG. 1.

Although the invention has been described in connection with a particular embodiment thereof, its scope is in no way limited to the details here shown and/or described, so that all modifications, and equivalent constructions, come within the scope of the invention. In particular the invention is not limited to the above-mentioned cereals or corns. It may be employed for working any cereal, in a green or in a dry state, in grains, in cobs or still on the stem. Moreover the inside units of the present machine can be mounted on agricultural machines already in existence, without leaving the scope of the invention.

What I claim is:

1. A machine for the working of cereals for the nourishment of cattle, comprising a housing having a hopper forming an opening for receiving the material to be worked and having an outlet for the worked material, and between said opening and said outlet, in said housing, a removable cutting group, a grinding group comprising at least a pair of grinding cylinders, each formed by a rotary shaft and a plurality of discs notched on their circumferential periphery and fixed on said shaft in side-by-side relation so as to form a cylinder capable of cooperating with a similar cylinder, and a conveying means for conveying worked material to said outlet, said cutting group comprising a plurality of star-shaped blades, each shaped as a three-point star, with each point of the star having a straight side and a convex side, a rotary shaft on which said blades are fixed axially spaced thereon and circumferentially staggered in a fan-wise arrangement, and stationary blades provided on the inside of the machine housing and cooperating with said star-shaped blades.

2. A machine for the working of cereals for the nourishment of cattle, comprising a housing having a hopper formed with an opening for receiving material to be worked, and having an outlet for the worked material, and between said opening and said outlet in said housing a removable cutting group, a grinding group comprising at least a pair of grinding cylinders, each formed by a rotary shaft and a plurality of discs notched on their circumferential periphery and fixed on said shaft in side-by-side relation so as to form a cylinder capable of cooperating with a similar cylinder, and conveying means for conveying worked material to said outlet, said notched discs each having at the circumferential periphery thereof a side bevel on each side with said bevels converging at the apex outwards along the whole circumferential extent of each disc and along the whole circumference at each bevel there being a plurality of indentations each formed by a step shaped part and a partially flush part which then slopes down inwardly up to the foot of the subsequent step.

3. A machine according to claim 2 wherein the circumferential apex formed by said bevels on each disc of a cylinder is placed at the recess between the bevels of two adjacent discs of the other cylinder.

4. A machine for the working of cereals for the nourishment of cattle, comprising a housing having a hopper forming an opening for receiving the material to be worked and having an outlet for the worked material, and between said opening and said outlet in said housing a removable cutting group, a grinding group comprising at least a pair of grinding cylinders, each formed by a rotary shaft and a plurality of discs notched at their circumferential periphery and fixed on said shaft in side-by-side relation so as to form a cylinder capable of cooperating with a similar cylinder, and conveying means for conveying worked material to the outlet, said conveying means including a screw feeder and a rotary shaft carrying the same, and a fan situated at said outlet and operatively connected with an end of the latter shaft which carries said screw feeder, said fan having a central hub and blades connected to and projecting therefrom, each fan blade having at a central region at said hub a notch for aiding in the outward flow of the worked material in a circumferential direction, and each blade having on opposed sides thereof and at the opposed ends thereof a pair of protruding parts, respectively, acting as a collecting and guiding means for the worked material.

* * * * *